(No Model.) 2 Sheets—Sheet 1.
A. GOLDENBERG.
FILE CUTTING MACHINE.
No. 413,319. Patented Oct. 22, 1889.
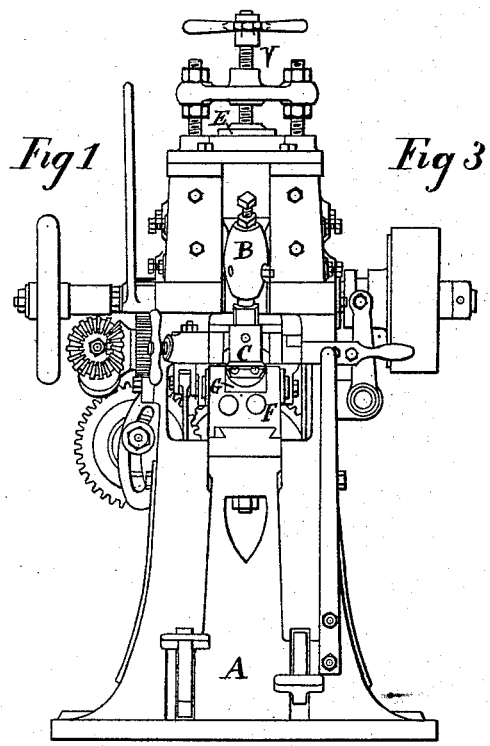
Fig. 1
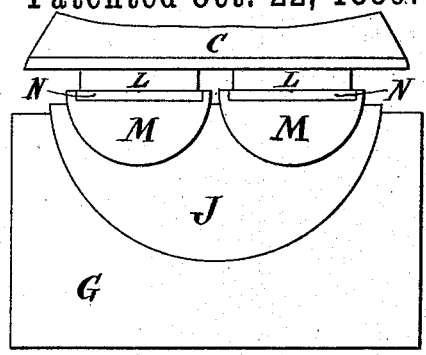
Fig. 3
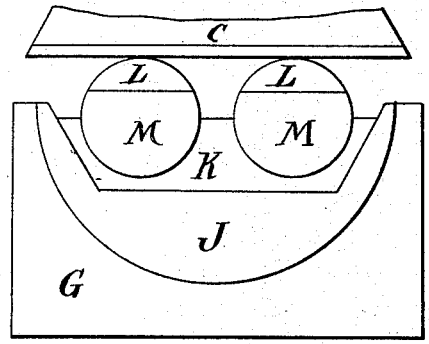
Fig. 7
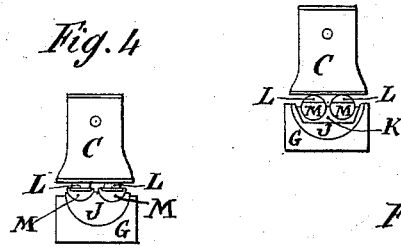
Fig. 4 Fig. 8
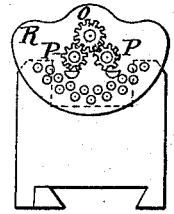
Fig. 9
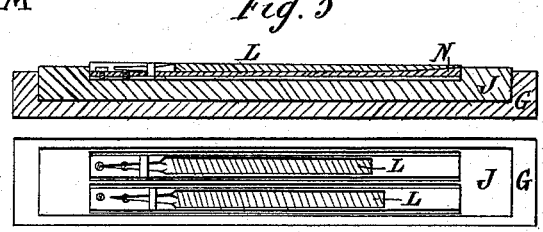
Fig. 5
Fig. 6
Witnesses
Inventor
Alfred Goldenberg.
By Edwin H. Brown his
Attorney (No Model.) 2 Sheets—Sheet 2.

A. GOLDENBERG.
FILE CUTTING MACHINE.

No. 413,319. Patented Oct. 22, 1889.

Witnesses

Inventor
Alfred Goldenberg
By Edwin H. Brown
his Attorney

UNITED STATES PATENT OFFICE.

ALFRED GOLDENBERG, OF PARIS, FRANCE.

FILE-CUTTING MACHINE.

SPECIFICATION forming part of Letters Patent No. 413,319, dated October 22, 1889.

Application filed April 9, 1889. Serial No. 306,528. (No model.)

*To all whom it may concern:*

Be it known that I, ALFRED GOLDENBERG, of Paris, France, have invented a new and useful Improvement in File-Cutting Machines, of which the following is a specification.

The invention consists, more particularly, in providing a rocking bed or holder constructed to present two or more file-blanks to the cutting-tools, in such manner that half-round or other formed file-blanks may be evenly cut.

My invention provides an improvement which may be applied to machines now in use to enable them to cut two or more files at the same time, although the drawings herewith provide for only two files; and it is to be further understood that I do not confine my invention to the style of cutter here shown and described.

Figure 2:
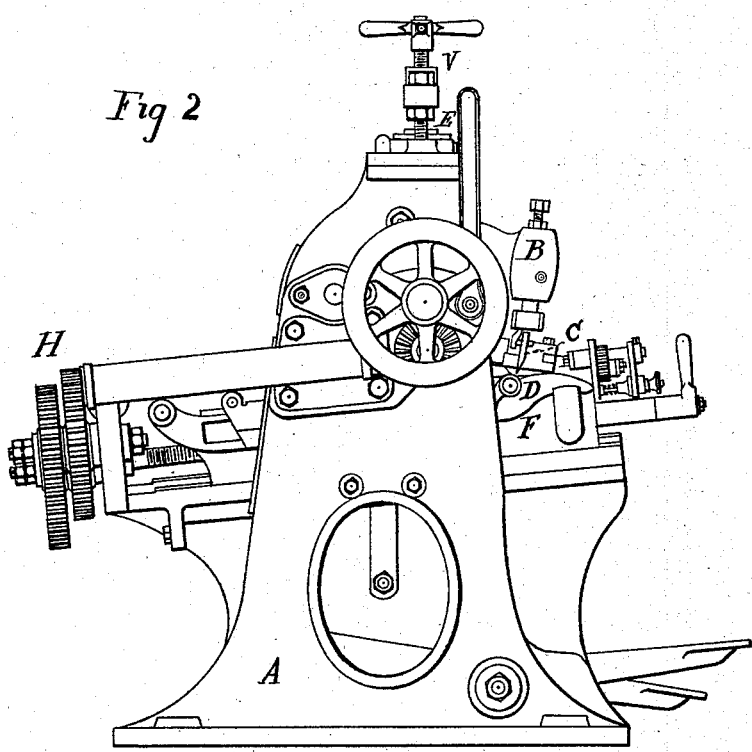
Figure 10:
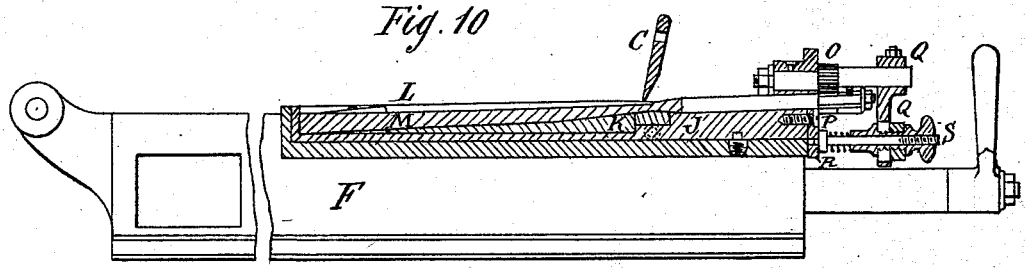
Figure 11:
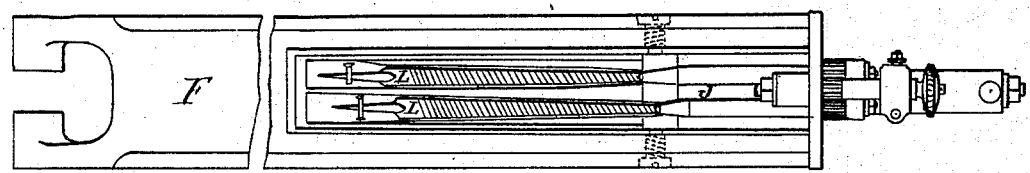

In the accompanying drawings, Figure 1 is a front view of a file-cutting machine embodying my invention. Fig. 2 is a side view of the same. Figs. 3 and 4 show a holder for flat files. Fig. 5 is a longitudinal section thereof. Fig. 6 is a top view of the same; and Figs. 7, 8, 9, 10, and 11 show modifications for holding round or half-round files.

I will describe a machine embodying my improvement, and then point out the novel features in claims.

The machine consists of a frame or standard A, a hammer B, to which the chisel C is secured in any well-known manner, and a bed or table F, which is furnished with a longitudinal slideway for the file-holders G. Alongside the bed or table F the rules or guides D are adjusted. The form of these guides vary to accommodate the different thicknesses of files to be cut, and the said guides work by means of rods fixed on an india-rubber spring placed inside the frame-work at the point E. This rubber spring acts similarly to a brake on the hammer B, and diminishes or increases the intensity of the stroke of the hammer, according as the regulating-screw is raised or lowered. The movement and speed of the bed or table F is regulated by gearing H, arranged at the back of the machine, which, when engaging with a worm-shaft, imparts a to-and-fro movement to the table F.

I combine with the cutting table and mechanism a file-holder constructed in such a way that each file to be cut has a mounting able to oscillate separately, while at the same time it advances with a perfect regularity. The file-holder may be described as follows: I use a block G, of cast-iron, which is placed in the groove of the carrying-table F. This block G has in all its length a half-round groove, in which a semi-cylindrical fulcrum-block J is placed. In order to cut flat files (see Figs. 3, 4, 5, and 6) two half-round slides are arranged at the flat part of this fulcrum, which slides run parallel and hold two file-holders M, and the upper surface of which is provided with two small tin plates or blades N, on which the file-blanks L are fixed. These two file-holders, being semi-cylindrical, can oscillate transversely, which causes each file-blank, during the cutting, to take a position exactly corresponding with the line of contact with the chisel. On one of the holders the file-blank is fixed in advance of the other, so as to regulate the obliquity of the cutting.

As the round and half-round files have on their backs a series of cuttings almost parallel, rising from the base to the point, they require a special apparatus which will allow the cutting of these several lengths without displacing the files. (See Figs. 7, 8, 9, 10, and 11.)

In order to cut the half-round files, the fulcrum-block J is provided with a sectional trapezoidal slide K, in which the file-holders are placed. When fixed in their proper position, tin or copper is melted and poured in the slide K, and the file-holders are thus mounted on their pads or wedges without requiring a special fitting. As it is necessary, in order to obtain the different longitudinal lines of the cutting supplied to these files, that each of these file-holders may be able to turn simultaneously with the other, a pinion or small toothed wheel P is mounted on each of them, and these two are connected by a third central pinion O, the axis of which carries a crank through which a pin-rod S, furnished with a spring, runs. This spring is coiled around the rod, and is intended to keep it in a hole of the dividing-plate R, in which it has been fixed to secure the file-holders at the inclination required to make the different cuttings on the file-blanks.

As the position of the file-holders and that of the crank can be regulated in a way quite independent of each other, it is therefore very easy, before commencing cutting a lot of files, to regulate the apparatus in such a way that the two files will be brought under the chisel in a thoroughly symmetrical position. The holes bored in the dividing-plate R, Fig. 9, are intended to regulate the separating distances of the longitudinal line of cuttings and the required position by the file-holders.

I do not describe the shapes of the various file-holders for the different styles of files, inasmuch as they are all comprised in the principles of one or the other of the systems I have explained.

Having described my invention, what I claim is—

1. The combination, with a moving bed and a cutter, of a holder for two or more files, and mechanism, substantially such as described, transversely oscillating said holder, substantially as specified.

2. The combination, with a moving bed and a cutter, of a block having a half-round groove, a fulcrum-block in said groove, and two or more file-holders in said fulcrum-block, the parts being so arranged that each file-holder has an independent oscillation, substantially as specified.

3. In a file-cutter, the combination, with a bed and a cutter, of a transversely-oscillating fulcrum-block and independently-oscillating file-holders on said block, substantially as specified.

In testimony that I claim the foregoing I have hereunto set my hand this 23d day of February, 1889.

ALFRED GOLDENBERG.

Witnesses:
LETOUZEY,
Y. LECOER.